US00RE43697E

(19) United States
(12) Reissued Patent
Duhn

(10) Patent Number: US RE43,697 E
(45) **Date of Reissued Patent: *Oct. 2, 2012**

(54) DRILLING QUICK CONNECTORS

(75) Inventor: Rex E. Duhn, The Woodlands, TX (US)

(73) Assignee: Seaboard International Inc., Houston, TX (US)

( * ) Notice: This patent is subject to a terminal disclaimer.

(21) Appl. No.: 10/325,047

(22) Filed: Dec. 20, 2002

Related U.S. Patent Documents

Reissue of:
(64) Patent No.: 6,199,914
Issued: Mar. 13, 2001
Appl. No.: 09/274,857
Filed: Mar. 23, 1999

U.S. Applications:
(60) Provisional application No. 60/088,586, filed on Jun. 9, 1998.

(51) Int. Cl.
*F16L 21/00* (2006.01)

(52) U.S. Cl. ..... 285/123.1; 285/309; 285/404; 285/123.13

(58) Field of Classification Search ..... 285/123.1, 285/123.4, 123.13, 309, 404
See application file for complete search history.

(56) References Cited

U.S. PATENT DOCUMENTS

| | | | | |
|---|---|---|---|---|
| 190,965 | A | | 5/1877 | Foster, Jr. |
| 503,432 | A | | 8/1893 | McIntyre |
| 1,122,422 | A | | 12/1914 | Ross |
| 1,193,923 | A | | 8/1916 | Rateike |
| 1,232,129 | A | | 7/1917 | Wafer |
| 1,455,971 | A | | 5/1923 | Rickenbacker et al. |
| 1,512,298 | A | | 10/1924 | Mueller |
| 1,607,430 | A | * | 11/1926 | Brewster ..... 166/75.11 |
| 1,898,617 | A | | 2/1933 | Church |
| 1,993,372 | A | | 3/1935 | Jones |
| 2,044,302 | A | | 6/1936 | Holton |
| 2,067,773 | A | | 1/1937 | Long |
| 2,075,899 | A | * | 4/1937 | Humason ..... 166/84.5 |
| 2,112,352 | A | | 3/1938 | Vetrano |
| 2,178,699 | A | * | 11/1939 | Penick et al. ..... 285/123.9 |
| 2,220,359 | A | * | 11/1940 | Tschappat ..... 166/88.3 |
| 2,284,869 | A | * | 6/1942 | Hinderliter ..... 277/324 |
| 2,391,632 | A | | 12/1945 | Knight et al. |
| 2,927,642 | A | * | 3/1960 | Meredith, Jr. et al. ..... 166/75.11 |
| 3,177,013 | A | * | 4/1965 | Rector ..... 285/123.2 |
| 3,239,248 | A | * | 3/1966 | Jones ..... 285/123.11 |
| 3,321,217 | A | * | 5/1967 | Ahlstone ..... 285/18 |
| 3,325,190 | A | * | 6/1967 | Eckert et. al. ..... 285/18 |
| 3,427,048 | A | * | 2/1969 | Brown ..... 285/18 |

(Continued)

OTHER PUBLICATIONS

Cooper Oil Tool, Fastlock Connector, catalog, 1992 (1 page).*

(Continued)

*Primary Examiner* — Aaron Dunwoody
(74) *Attorney, Agent, or Firm* — Christie, Parker & Hale, LLP

(57) ABSTRACT

A quick connector fitting assembly is provided which includes a fitting which releasably connects to a well casing for providing an interface for the attachment of various types of well related equipment. The quick connector fitting connects using fasteners to a lip or groove formed on the casing. The fasteners can easily connect or disconnect from the groove or lip facilitating the quick connection and disconnection of the fitting from the casing.

42 Claims, 12 Drawing Sheets

U.S. PATENT DOCUMENTS

| | | | | | |
|---|---|---|---|---|---|
| 3,435,395 | A | | 3/1969 | Lee | 166/75 |
| 3,435,895 | A | * | 4/1969 | Lee | 166/75.11 |
| 3,608,932 | A | * | 9/1971 | Brown | 285/18 |
| 3,827,728 | A | * | 8/1974 | Hynes | 285/90 |
| 3,955,835 | A | | 5/1976 | Farrington | |
| 4,056,272 | A | * | 11/1977 | Morrill | 285/123.13 |
| 4,114,928 | A | * | 9/1978 | Lochte | 285/18 |
| 4,124,231 | A | * | 11/1978 | Ahlstone | 285/18 |
| 4,209,193 | A | | 6/1980 | Ahlstone | |
| 4,335,904 | A | * | 6/1982 | Saliger et al. | 285/18 |
| 4,402,533 | A | * | 9/1983 | Ortloff | 285/18 |
| 4,441,740 | A | * | 4/1984 | Cowan et al. | 285/18 |
| 4,452,472 | A | * | 6/1984 | Crase | 285/3 |
| 4,522,430 | A | * | 6/1985 | Stromberg | 285/24 |
| 4,524,998 | A | * | 6/1985 | Brisco | 285/101 |
| 4,541,490 | A | * | 9/1985 | Bigbie et al. | 166/379 |
| 4,606,557 | A | * | 8/1986 | Coffey | 285/18 |
| 4,799,714 | A | * | 1/1989 | Collet | 285/123.11 |
| 4,923,006 | A | * | 5/1990 | Hartmann et al. | 166/65.1 |
| 4,974,676 | A | * | 12/1990 | Duhn et al. | 299/40.1 |
| 5,141,257 | A | * | 8/1992 | Taylor | 285/18 |
| 5,145,213 | A | * | 9/1992 | Marrison et al. | 285/2 |
| 5,149,143 | A | * | 9/1992 | Howell | 285/18 |
| 5,176,409 | A | | 1/1993 | Brooks | |
| 5,333,911 | A | * | 8/1994 | Watkins | 285/18 |
| 5,362,109 | A | | 11/1994 | Pacht | |
| 5,441,310 | A | * | 8/1995 | Barrett et al. | 285/18 |
| 5,611,398 | A | * | 3/1997 | Duhn et al. | 166/75.11 |
| 6,138,762 | A | * | 10/2000 | Sweeney et al. | 166/359 |

OTHER PUBLICATIONS

Huber-Hercules Wellhead Accessories, Drilling and Completion Flanges, catalog, p. 15, (1 page).*

Larkin Products, Inc. Drilling and Adaptor Flanges, catalog, p. 15 (1 page).*

Huber-Hercules Wellhead Accessories, Drilling and Completion Flanges, catalog, p. 15 (1 page).

Larkin Products, Inc., Drilling and Adaptor Flanges, catalog, p. 15, (1 page).

* cited by examiner 8
240
244
246
258
252
242
254
248
262
4C
256
292
226
212
218
250
236
222
238
220
234
4B
216
214

8
346
340
344
342

312
326
318
312
395
320
396
326
392
5B
314
328
394
314

DRILLING QUICK CONNECTORS

Matter enclosed in heavy brackets [ ] appears in the original patent but forms no part of this reissue specification; matter printed in italics indicates the additions made by reissue.

CROSS-REFERENCE TO RELATED APPLICATION

*More than one reissue application has been filed for the reissue of U.S. Pat. No. 6,199,914. The reissue applications are Reissue application Ser. No. 10/325,047 filed on Dec. 20, 2002 (the present application) and Reissue application Ser. No. 11/581,229, filed on Oct. 12, 2006 which is a Divisional of Reissue application Ser. No. 10/325,047.*

This application claims priority and is based on Provisional Application 60/088,586 filed on Jun. 9, 1998.

BACKGROUND OF THE INVENTION

This invention relates to quick connect assemblies including quick connector fittings which quickly and releasably connect to a well casing for providing an interface for attaching well related equipment such as blowout preventors to the casing.

Fittings, such as drilling flanges, are currently used to provide an interface to well casings for mounting various equipment such as blowout preventors. A conventional fitting, such as a drilling flange, is threaded onto the casing until a shoulder within the drilling flange makes contact with the casing mouth. An elastomeric O-ring seals the drilling flange/casing interface. Once such a drilling flange is mounted on a casing, it is difficult to remove. Consequently, in many instances, the drilling flange remains permanently on the casing. As a result, on the field where multiple drilling operations may be going on at once, a separate drilling flange is required for each casing. This can be expensive.

Another problem with these flanges is that their orientation with respect to the casing cannot be accurately predetermined. The orientation depends on how tight the flange is threaded on the casing. This shortcoming poses a problem in situations where the equipment to be attached requires a specific orientation relative to the casing.

As such, a quick connect assembly is needed which provides for the easy installation and removal of a quick connector fitting so as to allow the fitting to be used on multiple casings in the field and which allows the fitting to be oriented to any desired position relative to the casing.

SUMMARY OF THE INVENTION

The present invention is directed to quick connect assemblies allowing for the quick and releasable connection of a quick connector fitting to a well casing for providing an interface for the attachment of well related drilling equipment such as blowout preventors. In a first embodiment, a male receiver is coupled to the casing. The receiver has an annular lip formed on its outer surface near its upper open end or mouth. The annular lip has a lower surface which slopes upward in a radially outward direction. A quick connector fitting has a first cylindrical section which tapers to a smaller second cylindrical section. A flange extends radially from an upper end of the smaller cylindrical section. The flange provides the interface for attaching well related equipment. The larger cylindrical section of the fitting is slid over the mouth of the male receivers. Threaded openings are formed radially through the larger section of the fitting and are arranged circumferentially around the fitting. Lock screws are threaded through the openings to engage the lower sloping surface of the annular lip male receiver. As the lock screws are tightened, the lip sloping surface guides them downward thereby causing the fitting to seat and lock on the male receiver mouth. To remove the fitting, the lock screws are loosened.

In another embodiment, a quick connector fitting is used having an annular lip formed on its inner surface. A flange extends from an upper end of the fitting to provide the interface for attachment of the various well related equipment. The fitting lower end is slid over the casing head such that a lower surface of the annular lip is seated on the mouth of the casing. An annular groove is formed circumferentially around the outer surface of the fitting near the fitting lower end. The annular groove has a lower surface that slopes downward in a radially outward direction. A retainer slip, preferably a four piece retainer slip, having an upper and a lower annular lip is used to secure the fitting to the casing. The upper lip engages the groove, while the lower lip engages the outer surface of the casing. Teeth are formed on the face of the lower retainer slip lip that engages the casing. A clamp surrounds the retainer slip. As the clamp is tightened, it provides radial forces on the retainer slip causing the teeth formed on the lower lip to engage the casing outer surface and thus fix the position of the retainer slip relative to the casing. As the clamp is further tightened, the retainer slip upper lip engages the lower sloping surface of the groove formed on the outer surface of the fitting and causes the fitting to move downward against the casing. As a result, the annular lip formed on the inner surface of the fitting sits tightly against the casing mouth.

In yet a further embodiment, an annular bushing is threaded on the outer threads formed on the casing. Preferably the bushing is threaded downward about ¼ inch±⅛ inch from the casing mouth. An annular groove is formed on the outer surface of the bushing. The groove has an upper surface which slopes upward in a radially outward direction. A fitting is then fitted over the casing and the bushing. The fitting has an inner shoulder which sits on the mouth of the casing. On its opposite end, the fitting forms a flange for providing an interface for the well related equipment. Fasteners are threaded radially through the fitting to engage the upper surface annular groove. The sloping upper surface guides the fasteners downward thereby causing the fitting to tightly seat on the mouth of the casing and to lock on the bushing and thereby on the casing. Lock nuts may be threaded on the fasteners from the ends opposite the ends engaging the groove on the bushing. These lock nuts are threaded until they engage the outer surface of the fitting providing a radially outward force on the fasteners preventing them from loosening from the fitting.

In another embodiment an annular casing head is coupled to the casing. The casing head can be threaded directly to the casing or may be coupled to the casing using a coupling. An annular groove is formed on the outer surface of the casing head. The annular groove has an annular upper surface and an annular base.

A quick connector fitting is mated to the casing head. The quick connector fitting has a flange that extends from an upper end of the fitting for providing an interface for connecting well related equipment.

An annular drilling flange nut is threaded on the lower outer surface of the quick connector fitting. Load key bolts are fitted through radial openings formed on the flange nut. A retainer is used to retain each bolt on the flange nut. A preferable arc-shaped load key located inside the flange nut is threadedly engaged by each load key bolt. As a load key bolt is turned it causes its corresponding load key to translate radially and into the groove formed on the outer surface of the casing head. The flange nut is then further torqued causing the load keys to contact and apply a force against the upper surface of the annular groove on the casing head. As result, a downward force is applied by the flange nut on the quick connector fitting causing the quick connector to further sit on the mouth of the casing head forming a tight connection.

With any of the above described embodiments, a wear bushing ray be fitted such that it provides a protecting lining to the inner surface of the casing head and a portion of the quick connector inner surface extending above the casing head. Moreover, with all of these embodiments, the quick connector fittings are preferably fastened to a groove. As a result, the fittings can be oriented to any position over the casing mouth prior to being quickly and releasably connected to the casing.

DETAILED DESCRIPTION OF THE INVENTION

This invention relates to quick connect assemblies which include a quick connector fitting (also referred to herein as a "quick connector") that can be mounted quickly on a well casing providing an interface for the mounting of well related equipment such as blow out preventors ("BOP"). The quick connector fittings may be used and re-used on many different casings.

Figure 1A:
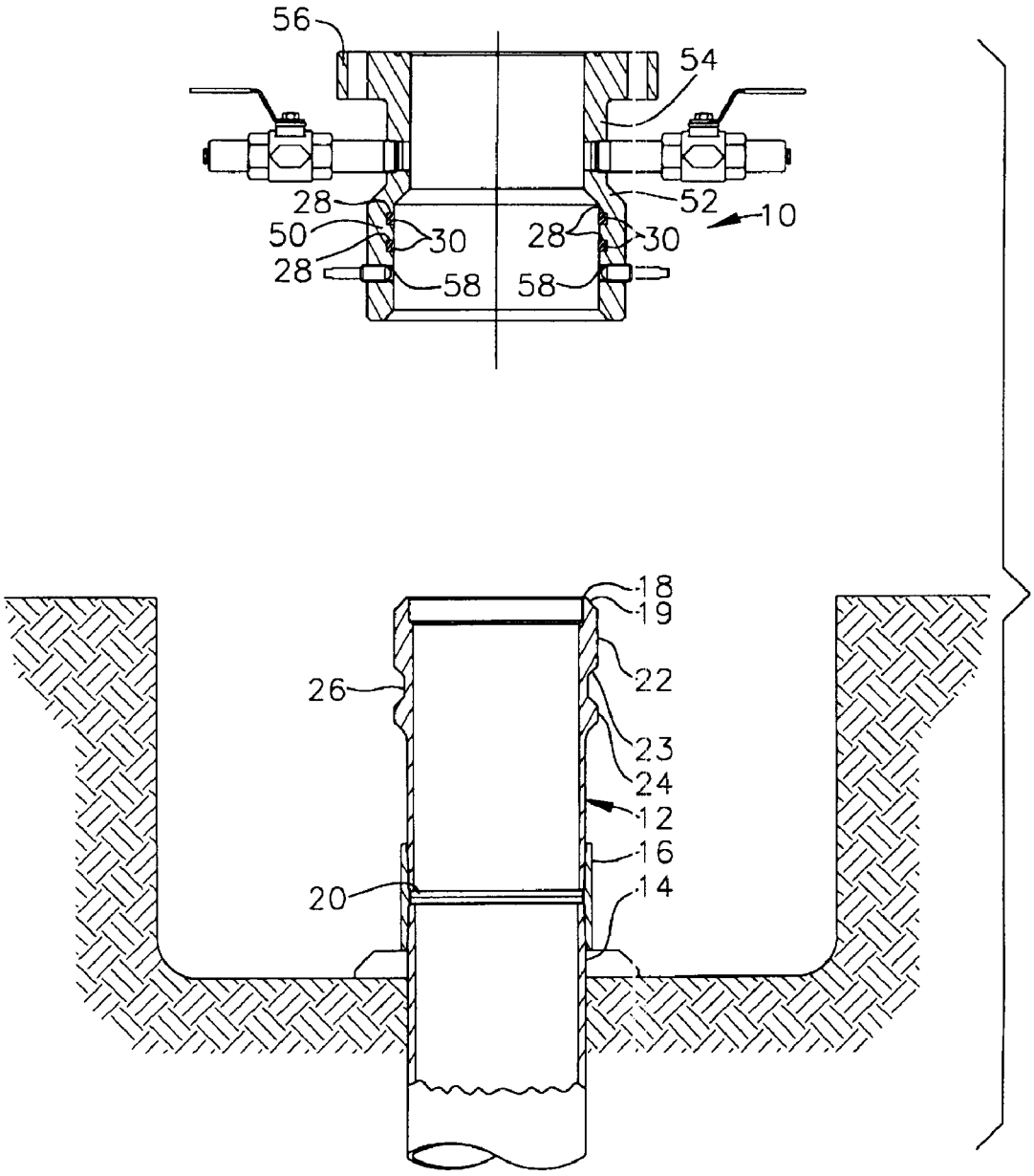
FIG. 1A is an exploded cross-sectional view of a quick connector assembly including a male receiver coupled to a well casing and a quick connector fitting.
Figure 1B:
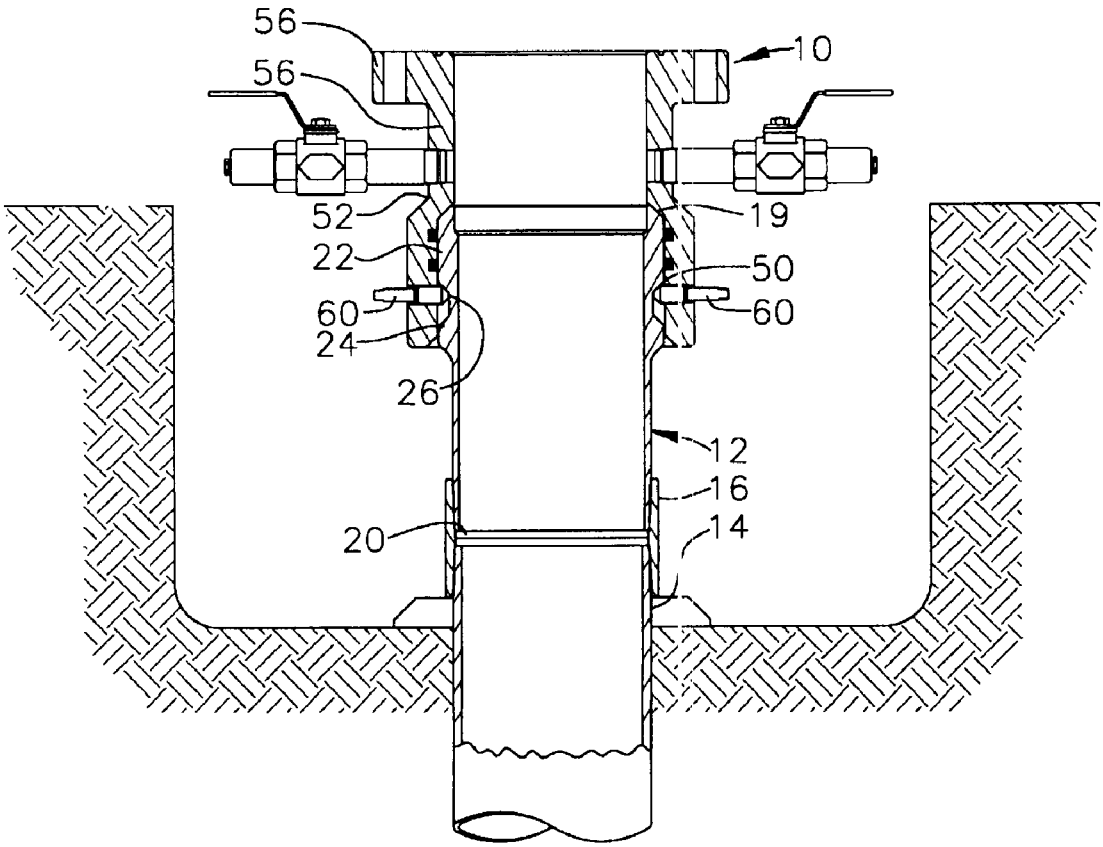
FIG. 1B is a cross-sectional view of the assembled quick connector assembly shown in FIG. 1A.

In a first embodiment, the quick connect assembly comprises a quick connector fitting 10 and a male receiver 12. The quick connector fitting 10 releasably connects to the male receiver 12 which is coupled to a well casing 14 (FIGS. 1A and 1B). The casings typically have a diameter of 13-⅜ inches. The male receiver is typically connected to the casing using a coupling 16. The coupling is an internally threaded cylindrical member. One end of the coupling is threaded to the external casing threads. The male receiver is then torqued to inner threads on the coupling other end.

The male receiver is typically a tubular member. The male receiver as a first end or mouth 18 for connecting with the quick connector fitting and a second end 20 for threading on the coupling. Two parallel annular lip protrusions are formed on the outer surface of the male receiver near it first end (FIGS. 1A and 1B). The first or upper lip 22 is formed around the mouth of the male receiver. The upper lip has an upper surface 19 that slopes downward in a radially outward direction. The upper lip also has a lower surface 23 that slopes upward in a radially outward direction. The second or lower lip 24 is formed below and spaced apart from the upper lip. An annular groove 26 is formed between the two lips.

The coupling 16 is threaded to the casing 14. The male receiver is then torqued to the coupling. The male receiver may be torqued to the coupling using conventional tools such as tongs (not shown). Once the male receiver is torqued in place, the quick connector is fitted over the male receiver. The quick connector has a first larger cylindrical section 50 which tapers via a tapered section 52 to a second smaller cylindrical section 54 (FIG. 1A). A flange 56 is formed around the mouth of the second section to allow for the connection of a BOP or other well related equipment. The BOP or other well related equipment may be connected to the flange prior to installation of the quick connector to the male receiver.

The larger cylindrical section of the quick connector is placed over the male receiver such that its tapered section contacts and mates with the sloping upper surface 19 of the upper lip 22 at the mouth of the male receiver. At least two internally threaded holes 58 are formed circumferentially on the larger cylindrical section of the quick connector. When in position over the male receiver, the holes 58 are aligned with an upper portion of the groove 26 formed between the lips on the male receiver (FIG. 1B). Lock down screws 60 are then threaded through the holes and engage the lower sloping surface 23 of the upper lip. As the lock down screws are threaded farther, they ride on the sloping lower surface of the upper lip pulling the quick connector tighter against the mouth of the male receiver.

Preferably, two annular grooves 28 are formed on the inner surface of the first cylindrical section above the threaded holes 58. A pressure or mechanically energized seal 30 is fitted in each groove. A single groove fitted with a single seal may suffice. When the quick connector is mounted an the male receiver, the seals 30 also contact the outer surface of the upper lip of the male receiver. As such, the seals form a seal against the upper lip as well as against the inner surface of the first cylindrical section of the quick connector fitting. Alternatively, the grooves 28 may be formed on the outer surface of the upper lip of the male receiver instead of the quick connector first section inner surface. The seals 30 are then seated on the grooves such that when the fitting is positioned over the male receiver, the seals will again seal against the inner surface of the first section of the quick connector and against the upper lip of the male receiver. Alternatively, the groove(s) and seal(s) may be positioned so that the seal(s) seal against the male receiver lower lip and the inner surface of the first cylindrical section of the quick connector. In a further embodiment, a seal or multiple seals may be used to form a seal against the inner surface of the quick connector and the male receiver upper lip while a second seal or second set of seals may be used to form a seal between the quick connector and the male receiver lower lip.

Figure 2A:
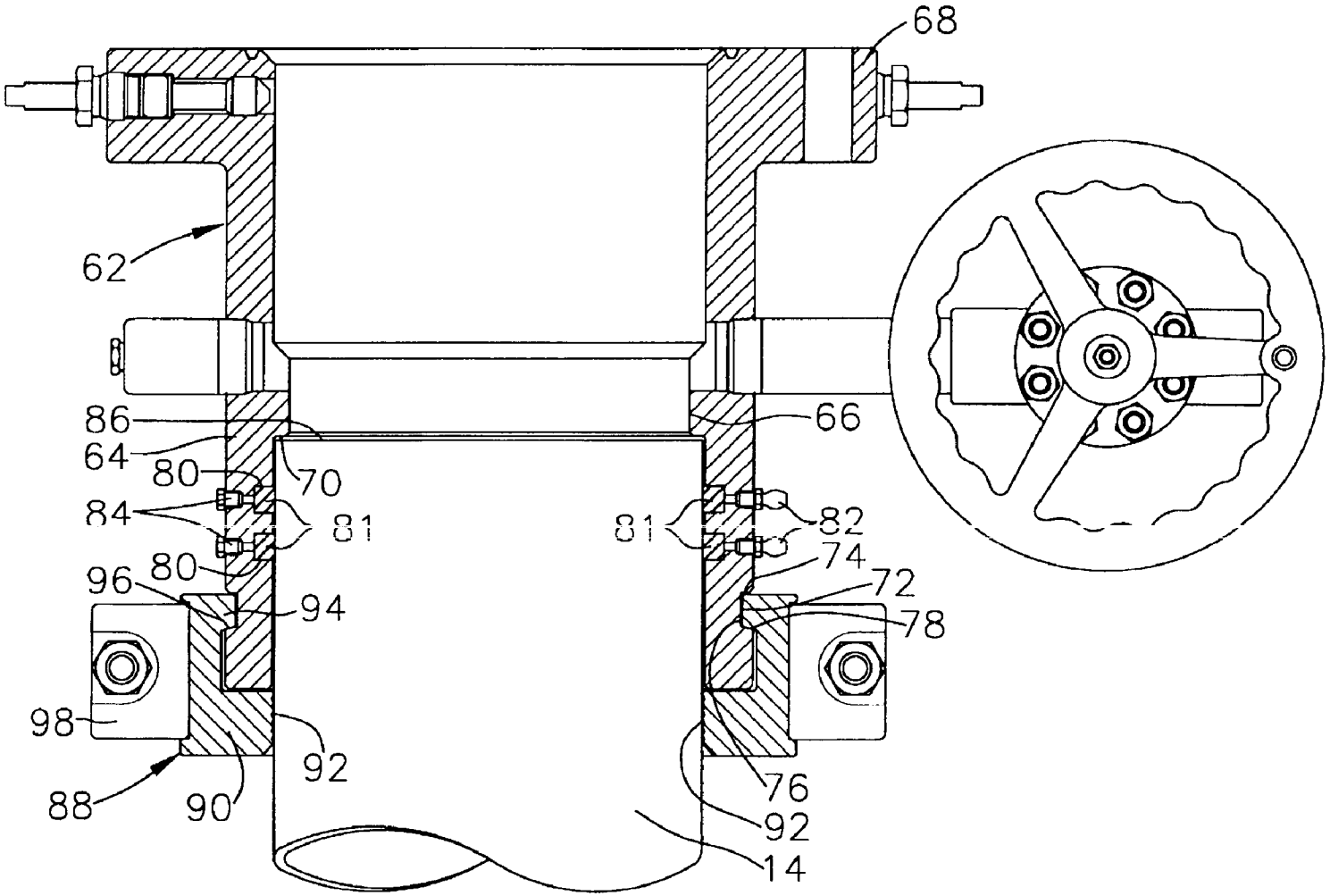
FIG. 2A is a partial cross-sectional view of an alternate embodiment quick connector.
Figure 2B:
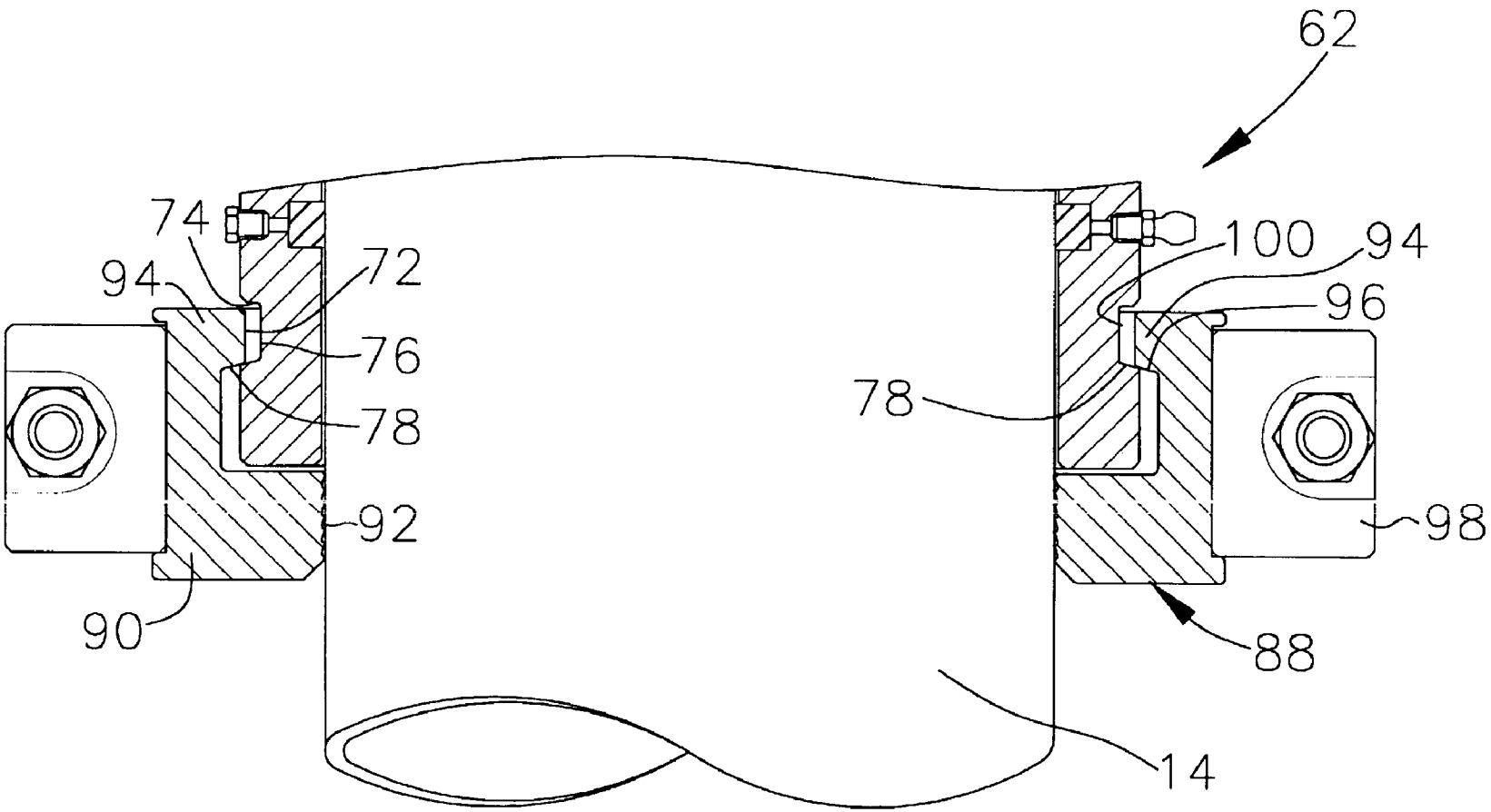
FIG. 2B is a partial cross-sectional view of the quick connector shown in FIG. 2A prior to the tightening of a slip retainer clamp.

In an alternate embodiment, a quick connector fitting 62 is used that fits directly over the outer casing 14 (FIG. 2A). This quick connector consists of a cylindrical body 64. An inner annular lip 66 is formed on the inner surface of the cylindrical body. An outer annular flange 68 is formed on the upper end of the cylindrical body. The upper flange serves as the connection interface with the BOP or other well related equipment. An annular groove 72 is formed on the outer surface of the cylindrical body near the body lower end (FIG. 2B). In cross-section, the groove has an upper surface 74, a base 76 parallel to the longitudinal axis of the body and a lower surface 78 that slopes downward in a radially outward direction.

One, but preferably two, spaced apart annular grooves 80 are formed on the inner surface of the body below the inner annular lip (FIG. 2A). These grooves are designed to accommodate pressure or mechanically energized seals (not shown). In an alternate embodiment, an injection fitting 82 and a pressure relief fitting 84 are fitted in the wall of the body such that they extend from the outer surface of the body to an inner groove. The injection fitting and the pressure relief fitting should be spaced preferably 180° apart. An injection and a pressure relief fitting may be incorporated for each of the inner grooves.

The quick connector is slid over the outer surface of the casing 14 until the lower face 70 of the inner lip 66 rests against the mouth 86 of the casing. In the embodiment where the inner annular grooves 80 are fitted with seals, the seals must be fitted in the grooves prior to the installation of the quick connector over the casing.

A retainer slip 88 is fitted over the quick connect. The retainer slip is preferably in four pieces, each forming a 90 degree arc. However, a two or more piece retainer slip may also be used. The retainer slip consists of a lower annular lip 90 extending radially inward. Teeth 92 are formed on the inner surface of the lower annular lip. The retainer slip also has an upper inwardly extending annular lip 94 that has a shape complementary to the shape of the groove 72 formed on the outer surface of the quick connector body. As such, the lower surface 96 of the retainer slip upper lip slopes downwardly in a radially outward direction such that it is complementary to the bottom sloped surface 78 of the annular external groove formed on the quick connector body.

A slip retainer clamp 98 is clamped around the retainer slip so as to hold all the retainer slip pieces in place. As is apparent to one skilled in the art, it may be preferable to place the retainer slip and clamp over the casing prior to the placement of the quick connector body over the casing. In this regard, when the body is fitted over the casing, the slip may be easily moved over the quick connector body and clamped into place.

Initially, the clamp is tightened just enough to hold the retainer slip pieces in place as shown in FIG. 2B. When this occurs the tip portion 100 of the retainer slip upper lip is in contact with the lower sloped surface 78 of the groove formed on the body outer surface. As the clamp is further tightened, the teeth 92 formed on the inner surface of the lower lip of the retainer slip bite onto the outer surface of the casing 14 fixing the relative position between the casing and the retainer slip. As the clamp is further tightened, it causes the lower sloped surface 96 of the upper lip of the slip to attempt to travel up the lower sloped surface 78 of the external groove. As a result, the retainer slip, which is now fixed relative to the casing, causes the quick connector body to move downward and therefore the body inner lip lower surface 70 to tightly engage the mouth 86 of the casing.

If the body has injection and pressure relief fittings, a sealing material 81 may be injected into the annular grooves through the injection fittings 82 until it is relieved through the pressure relief fittings 84 to form a seal between the casing and the connector.

Figure 2C:
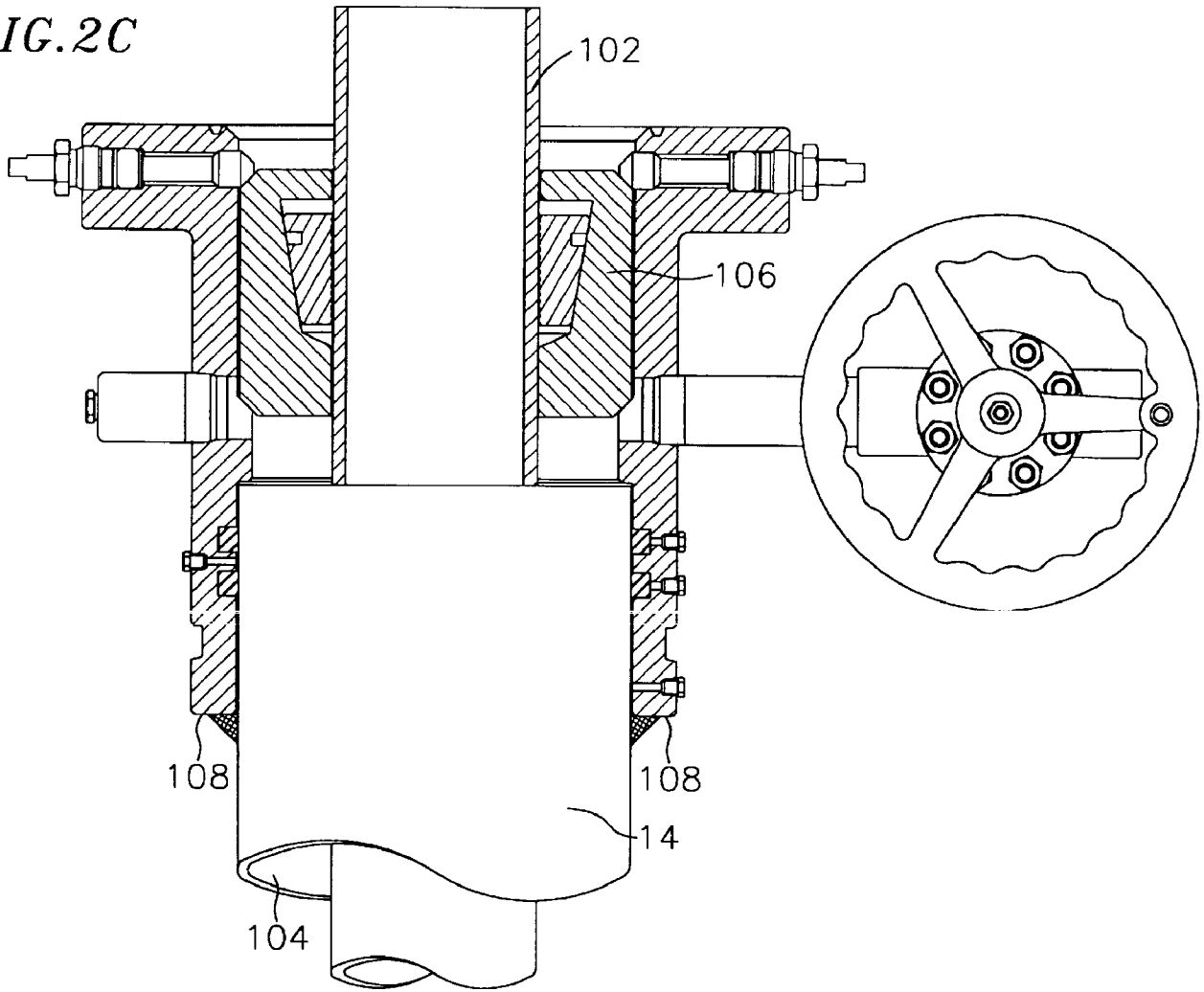
FIG. 2C is a partial cross-sectional view of the quick connector shown in FIG. 2A with the quick connector body welded to the casing.

A production or inner casing 102 is always fitted within the casing 14 (i.e., the outer casing) forming an annulus 104 therebetween (FIG. 2C). In many situations, after drilling is completed, a predetermined amount of cement is pumped down the production casing until it exits the lower end production casing and comes around filling and sealing the annulus.

For proper sealing, the Department of Oil and Gas ("DOG") requires that the annulus is completely filled with cement. As such, enough cement must be pumped to fill the annulus. If more cement than required to fill the annulus is pumped, the cement will stay within the bottom of the production casing creating a blockage. As such, operators are inclined to be conservative in the amount of cement pumped into the production casing. As a result, sometimes the amount of cement pumped may be insufficient and does not fill the annulus completely. In these situations, the DOG permits the use of an automatic casing hanger 106—or with a pack-off hanger (not shown) or with a mandrel casing hanger (not shown)—fitted within the quick connector as a supplement for sealing the annulus. Automatic casing hangers, pack-off hangers and mandrel casing hangers are well known in the art. When a hanger is used for sealing, the quick connector becomes a permanent fixture of the casing and thus, cannot be used with another casing. For economic purposes, however, it is recommended that the retainer clamp 98 and retainer slip 88 are removed so that they can be re-used. In their stead, the lower edge 108 of the quick connector body is welded to the outer casing.

Figure 3:
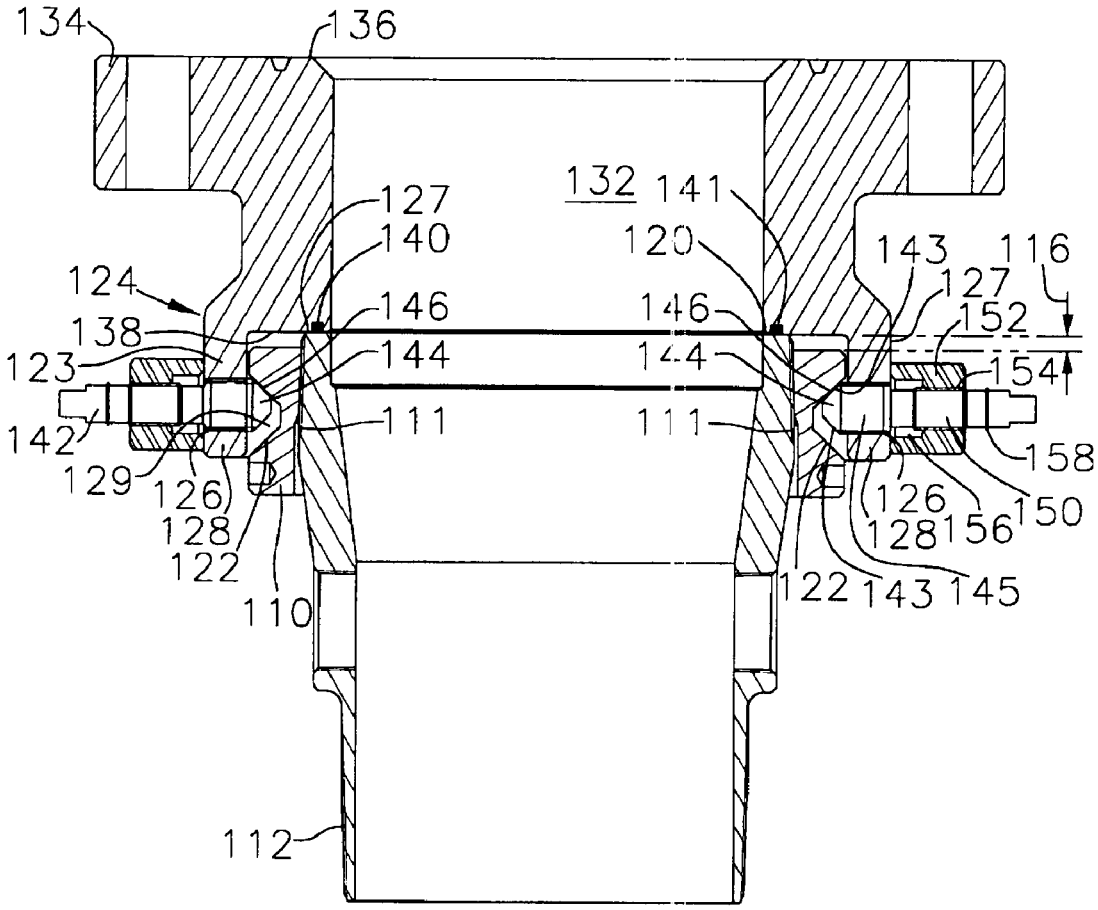
FIG. 3 is a cross-sectional view of an alternate embodiment quick connector assembly incorporating a bushing.

In a further embodiment, an annular bushing 110 is threaded hand tight on the outer threads 111 formed on the outer surface of the casing head 112 (FIG. 3). The casing head is coupled to the open end of a casing (not shown), preferably by threading. The outer bushing is preferably threaded down a distance 116 of about ¼ inch±⅛ inch from the casing head mouth 120. A circumferential groove 129 is formed on the outer surface of the bushing. The groove has an upper surface 146 that slopes upward in a radially outward direction. A quick connect fitting 124 is fitted over the bushing and the casing head.

The quick connector fitting has an upper and a lower section. The lower section defined by an annular lip wall 128 which defines a first opening with a diameter slightly larger than the hushing outer surface diameter. At least two internally threaded holes 126 are defined circumferential through the wall 128. A second opening 132 is defined in the upper section of the fitting. The second opening concentric to and in communication with the first opening and has a diameter preferably equal to the inner diameter of the mouth of the casing head. A flange 134 is formed at the mouth 136 of the upper section for mating with a BOP or other well related equipment. An internal annular shoulder 138 is formed at the interface between the upper and lower sections of the flange member. An annular groove 140 is formed on the shoulder to accommodate a pressure or mechanically energized seal 141.

The fitting is fitted over the bushing and rotated to a desired position. When the flange is fitted over the casing head, the seal sits on the mouth 127 of the casing head. When the fitting is seated on the casing head mouth, the threaded hole 126 centers will be located at a level aligned with an upper portion of the bushing circumferential groove. Lock down screws 142 having a threaded head 145 are then threaded through the threaded holes. The lock down screw heads have a tip portion 144 that is frusto-conical in shape having a frusto-conical surface 143. As the lock down screws are threaded into the holes their tip portions first engage the sloping upper surface 146 of the bushing groove. As they are further threaded on the fitting they ride against the groove upper sloping surface pulling the quick connector fitting further downward and creating a tight seal between the fitting shoulder, the seal, and the mouth of the casing head. Consequently, the fitting is locked on the bushing and thereby on the casing head. Because the fitting locks against a groove (i.e., the bushing groove 146), the fitting can be rotated and locked at any desired position.

In a further embodiment, the lock down screws 142 have a section 150 of their shaft threaded. This threaded shaft section is spaced apart from the threaded head section of the screws which engage the threaded holes 126. A lock nut 152 is threaded on the threaded section 150 formed on the shaft of each screw after the screws have locked the fitting on the bushing. The lock nut 152 has a central threaded bore section 154 which extends into a non-threaded bore section 156. The non-threaded bore section has a diameter larger than the threaded bore section. As the nut is screwed on the threaded shaft, its unthreaded bore section contacts the fitting annular wall 128 outer surface. As it is further screwed, it exerts a radial outward force on the screw which is threaded on the fitting wall, thereby locking the screw in place. A retainer ring 158 may then be fitted on the screw behind the nut to prevent the nut from getting lost if it were to loosen. The screw with lock nut can be preassembled with the retainer ring in place.

Figure 4A:
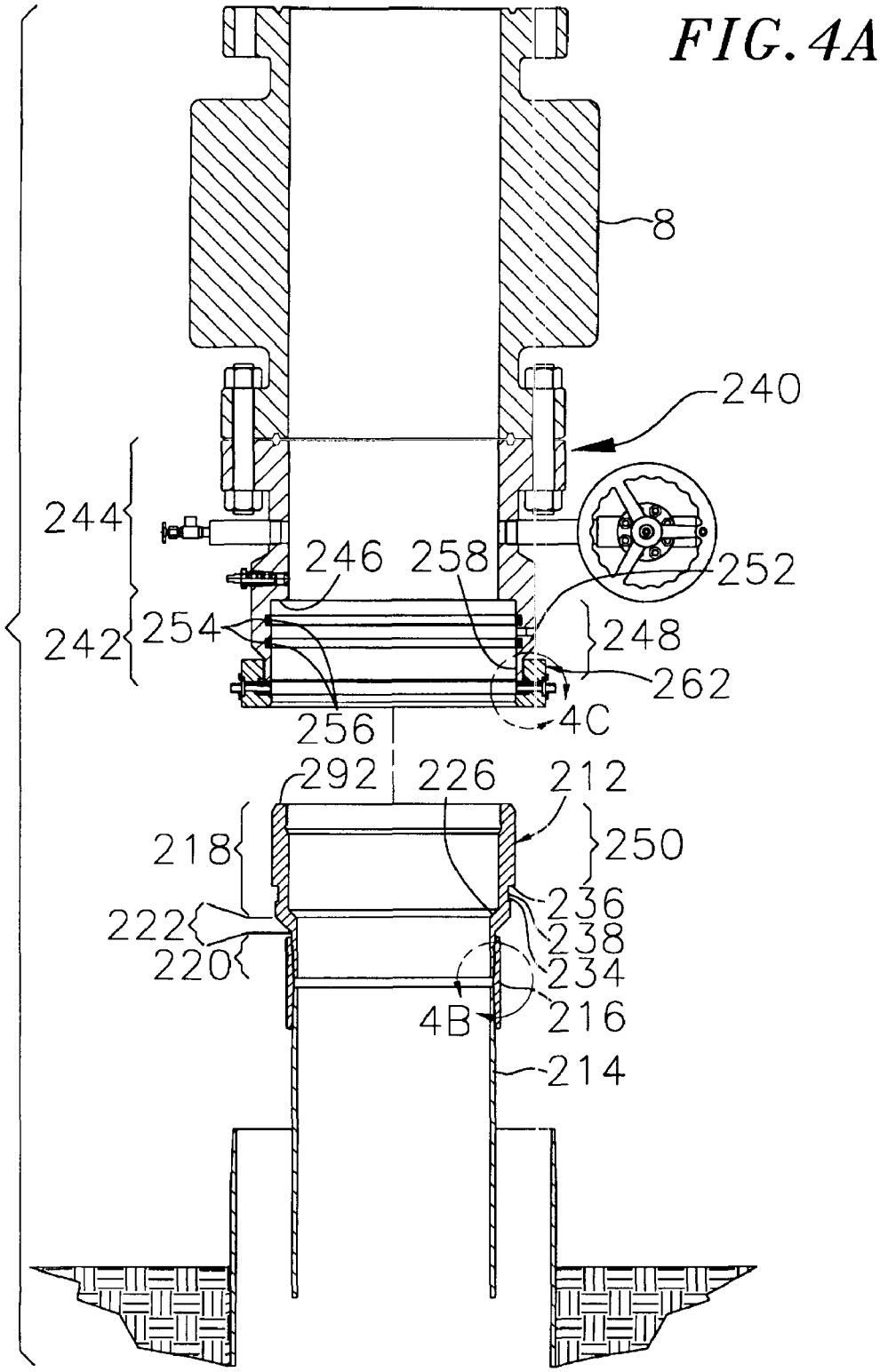
FIG. 4A is an exploded cross-sectional view of an alternate embodiment quick connector assembly prior to the mounting of the quick connector fitting on to the casing head.

In another embodiment an annular casing head 212 is coupled to the casing 214 using an annular coupling member 216 (FIG. 4A). Typically the casing head has a first annular portion 218 which tapers into a second annular portion 220 via a truncated cone shaped annular third portion 222. The first portion has an inner diameter greater than the inner diameter of the second portion. The second portion has threads 224 formed on its outer surface at its and furthest from the first portion. The inner surface of the third portion defines a shoulder 226 that slopes upward in a radially outward direction.

Figure 4B:
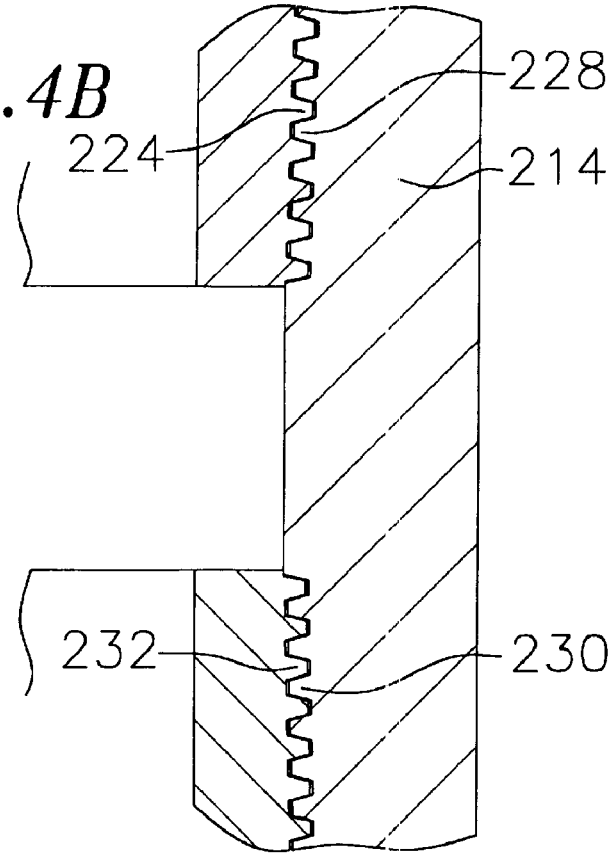
FIG. 4B is an enlarged cross-sectional view of the coupling member of the assembly shown in FIG. 4A coupling the casing head to the casing.

The coupling member 216 is a cylindrical member having inner threads. Preferably two sets of threads are formed beginning on the inner surface of the coupling member, one set at either end. The first set of threads 228 are matched to the outer threads 224 formed on the second portion of the casing head (FIG. 4B). The second set of threads 230 are matched to the outer threads 232 on the casing. The coupling through its second set of threads is threaded on the outer threads of the casing. The casing head is then threaded onto the first set of the coupling threads.

An annular groove 234 is formed on the outer surface of the first portion of the casing head near the intersection of the first portion with the truncated cone shaped portion. The annular groove has an annular upper surface 236 and an annular base 238.

A quick connector fitting 240 is then mated to the casing head. The quick connector fitting has a first section 242 which extends into a second section 244 forming an inner annular shoulder 246 at interface between the first and second section inner surfaces. In other words, the fitting first section has an inner diameter is larger than the inner diameter of the second section. The length of the first section as measured from the annular shoulder should be slightly less then the length 250 measured from the mouth of the casing head to the upper surface of the annular groove. A flange extends from the end of the second section opposite the first section providing an interface for connecting well related equipment.

Preferably two annular grooves 254 are formed on the inner surface of the first section, preferably on the upper thicker wall portion of the section. A flange seal 256, which is typically an O-ring seal, is fitted into each groove. An annular wall 252 defines the fitting first section. The annular wall 252 is thinner at the open or lower end of the first section. However, the inner diameter of the first section in constant throughout the length of the section. Threads 260 are formed on the outer surface of the lower thinner portion 258 of the fitting first section.

Figure 4C:
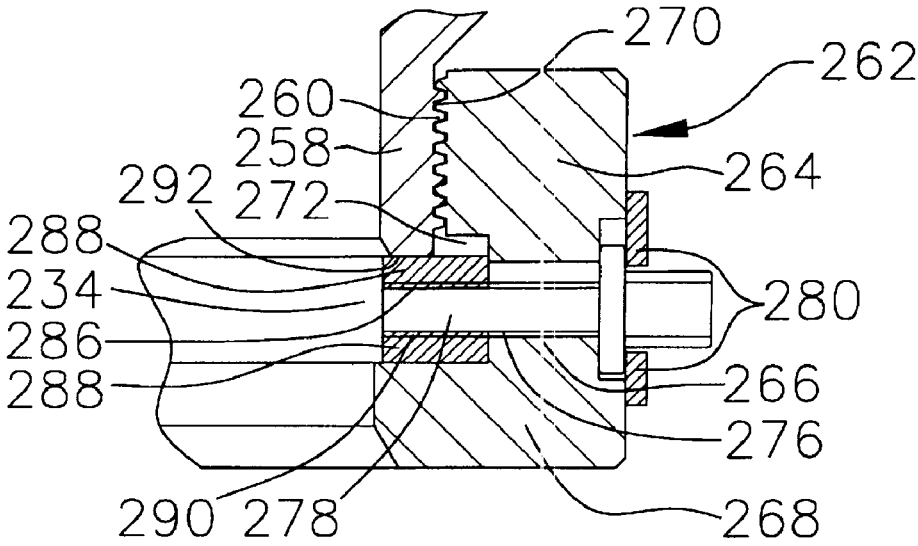
FIG. 4C is an enlarged cross-sectional view of the drilling flange nut of the assembly shown in FIG. 4A.

An annular drilling flange nut 262 has an annular upper section 264, an annular intermediate section 266 and an annular lower section 268 (FIGS. 4A and 4C). The inner surface diameter of the upper section is smaller than the inner surface diameter of the intermediate section and greater than the inner surface diameter of the lower section. The inner surface diameter of the lower section should preferably be at least slightly larger than the outer surface diameter of the casing head first section 218. The three sections form an annular channel 272. Threads 270 are formed on inner surface of the upper annular section matched to the threads 260 on the outer surface of the lower portion 258 of the fitting first section.

Figure 4D:
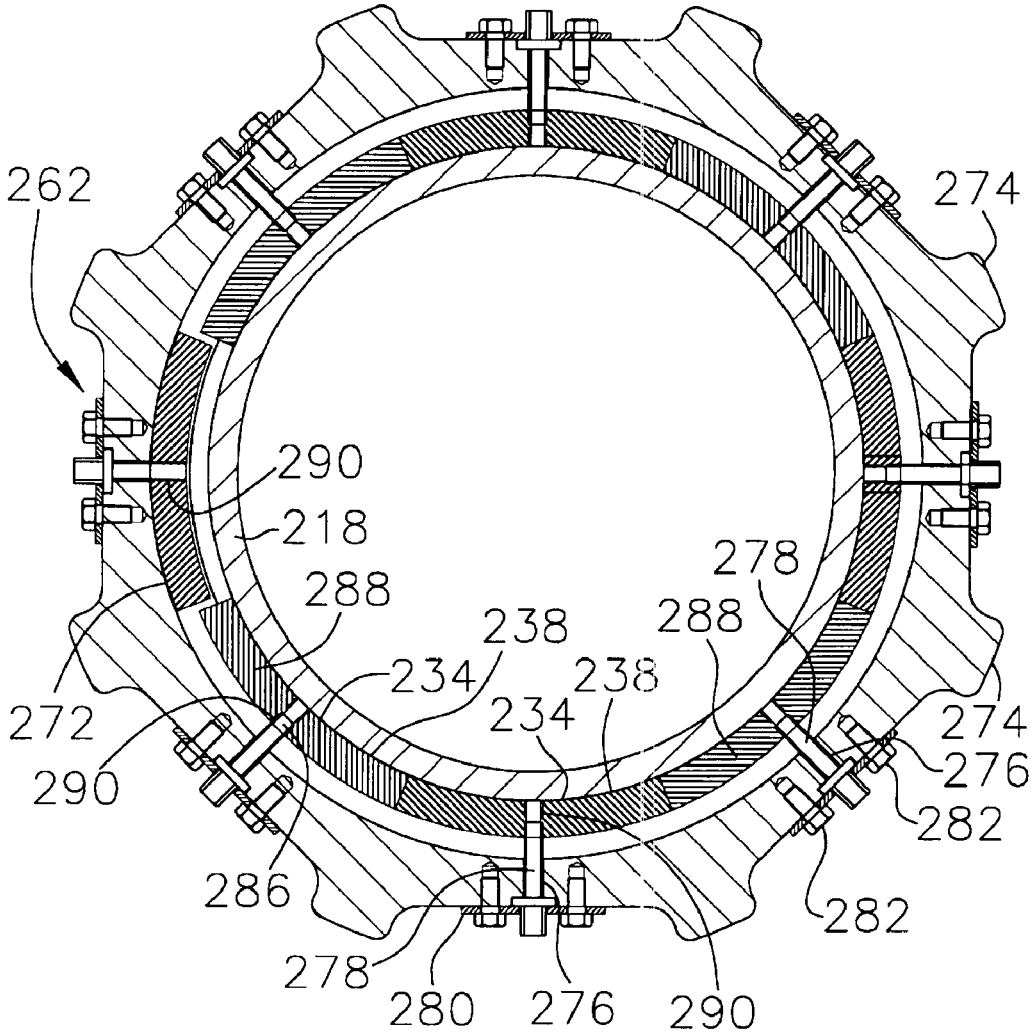
FIG. 4D is another cross-sectional view of the drilling flange nut shown in FIG. 4C.

The outer surface of the drilling flange nut 242 preferably has an octagonal shape providing grip 274 areas for torquing on to the fitting using a wrench or a hammer (FIG. 4D). Radial openings 276 are formed equidistantly through the nut outer surface penetrating the nut intermediate section and exiting on the annular channel 272 formed on the inner surface of the flange nut. The openings are formed to accommodate load key bolts 278. Each load key bolt is rotatably connected to a retainer 280. The retainer is perpendicular to the load key bolt. Each load key bolt can rotate relative to, but cannot longitudinal translate through, its corresponding retainer. The load key bolts are fitted through the radial opening 276 on the flange nut and the retainer 280 is bolted on the outer surface of the flange nut using retainer bolts 282.

A tip portion 286 of each load key bolt shaft extending radially beyond its corresponding radial opening 276 is threaded. Each load key bolt is able to freely rotate relative to its corresponding opening 276 formed on the flange nut. An arc shaped load key 288 is threaded to each threaded shaft portion 286. In a preferred embodiment, eight load keys are used, one for each load key bolt. Each load key is an eighth of a ring section. The load key bolt is threaded to a threaded opening 290 formed on the center section of the load key causing the load keys to translate radially outward and rest against the annular channel 272 formed on the flange nut.

Figure 4E:
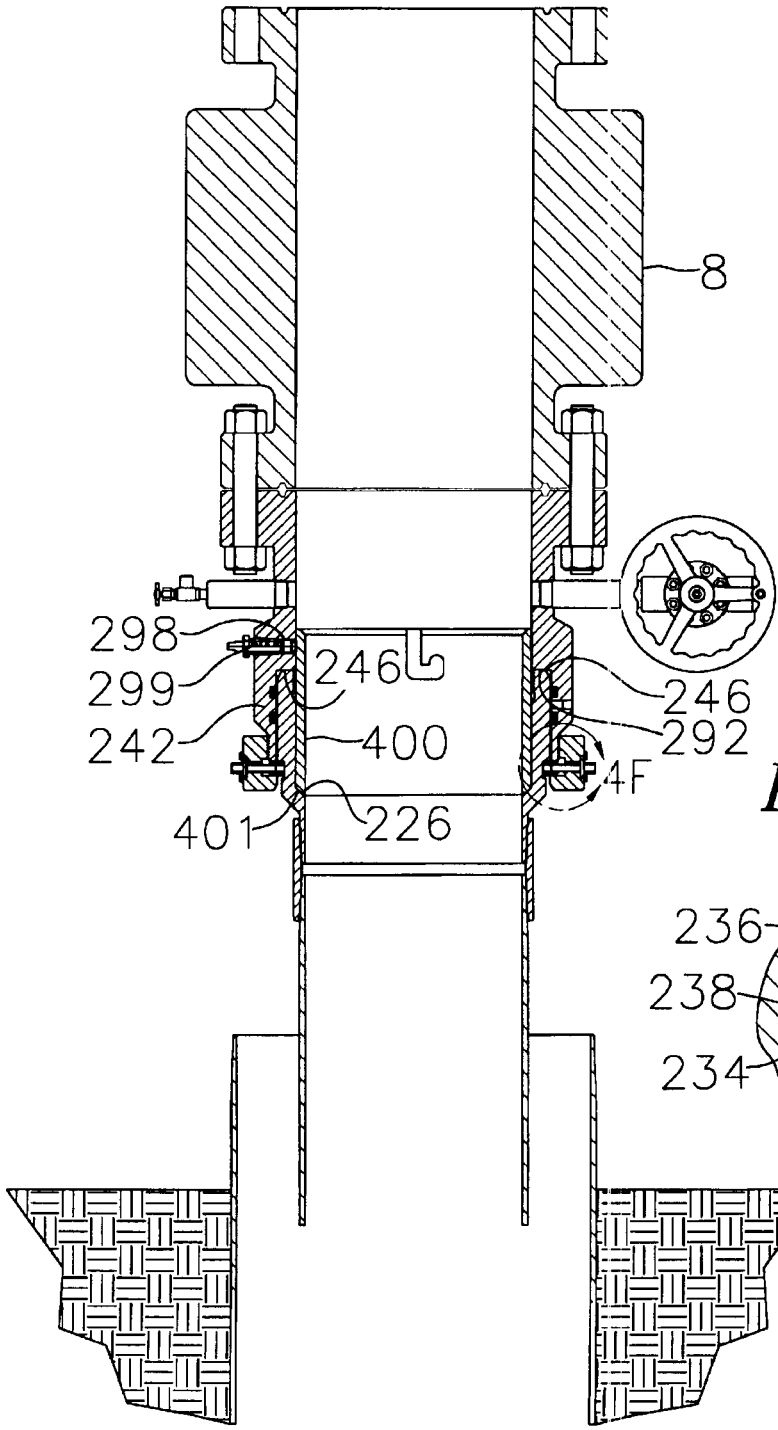
FIG. 4E is a cross-sectional view of the assembled quick connector assembly shown in FIG. 4A.

The inner surface diameter of the quick connector first section 242 is slightly greater than the outer surface diameter of the casing head first portion 218. The quick connector is slid over the casing head until the annular shoulder 246 sits on the mouth 292 of the casing head (FIG. 4E). When at this position, the lowest end 243 of the fitting first section 242 extends almost to the upper surface 236 of the annular groove formed on the outer surface of the casing head. The fitting is rotated in relation to the casing head to a desired orientation.

The flange nut is then threaded to the outer threads 260 formed on the first section of the fitting. The flange nut may also be pre-threaded on the first section of the fitting prior to mounting the fitting over the casing head. When the flange nut is threaded on the fitting, the load keys are sandwiched between the lower portion 288 of the flange nut 262 and the lower end 243 of the fitting first section.

The flange nut is threaded sufficiently for aligning the load keys with the groove 234 formed on the outer surface of the casing head. Each load key bolt is then rotated causing its respective load key to unthread from the load key bolt and travel radially inward into the groove 234 formed on the casing head (FIG. 4D). The load keys bolts are rotated until the load keys stop against the base 238 of the casing head groove without exerting a force on the groove. When in that position, preferably, all the load keys abut each other forming a continuous ring.

Figure 4F:
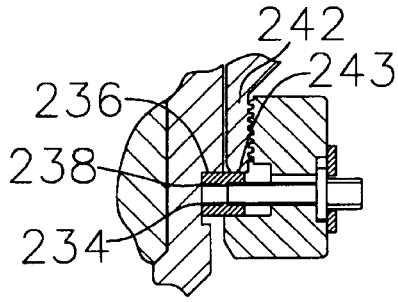
FIG. 4F is an enlarged cross-sectional view of the drilling flange nut of the assembly shown in FIG. 4E.

The flange nut is then further torqued on the lower portion of the fitting first section causing the load keys to contact and apply a force against the upper surface 236 of the annular groove 234 on the casing head (FIG. 4F). As result, a downward force is applied by the flange nut on the quick connector first section causing the quick connector to further sit on the mouth 292 of the casing head forming a tight connection.

Figures 5A, 5B:
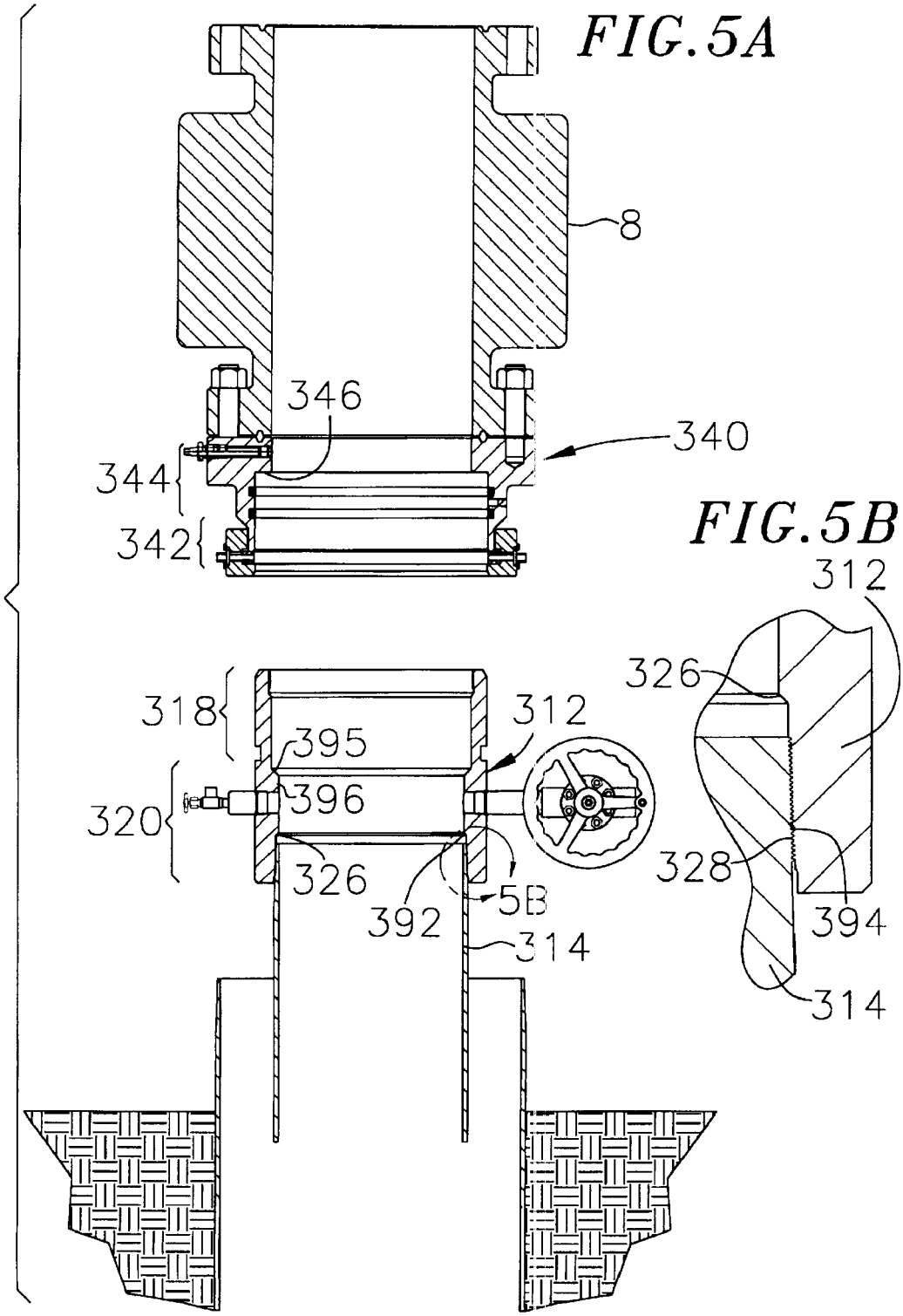
FIG. 5A is an exploded cross-sectional view of another embodiment quick connector assembly.
FIG. 5B is a partial enlarged cross-sectional view of the casing head of the assembly shown in FIG. 5A threaded to a casing.
Figure 5C:
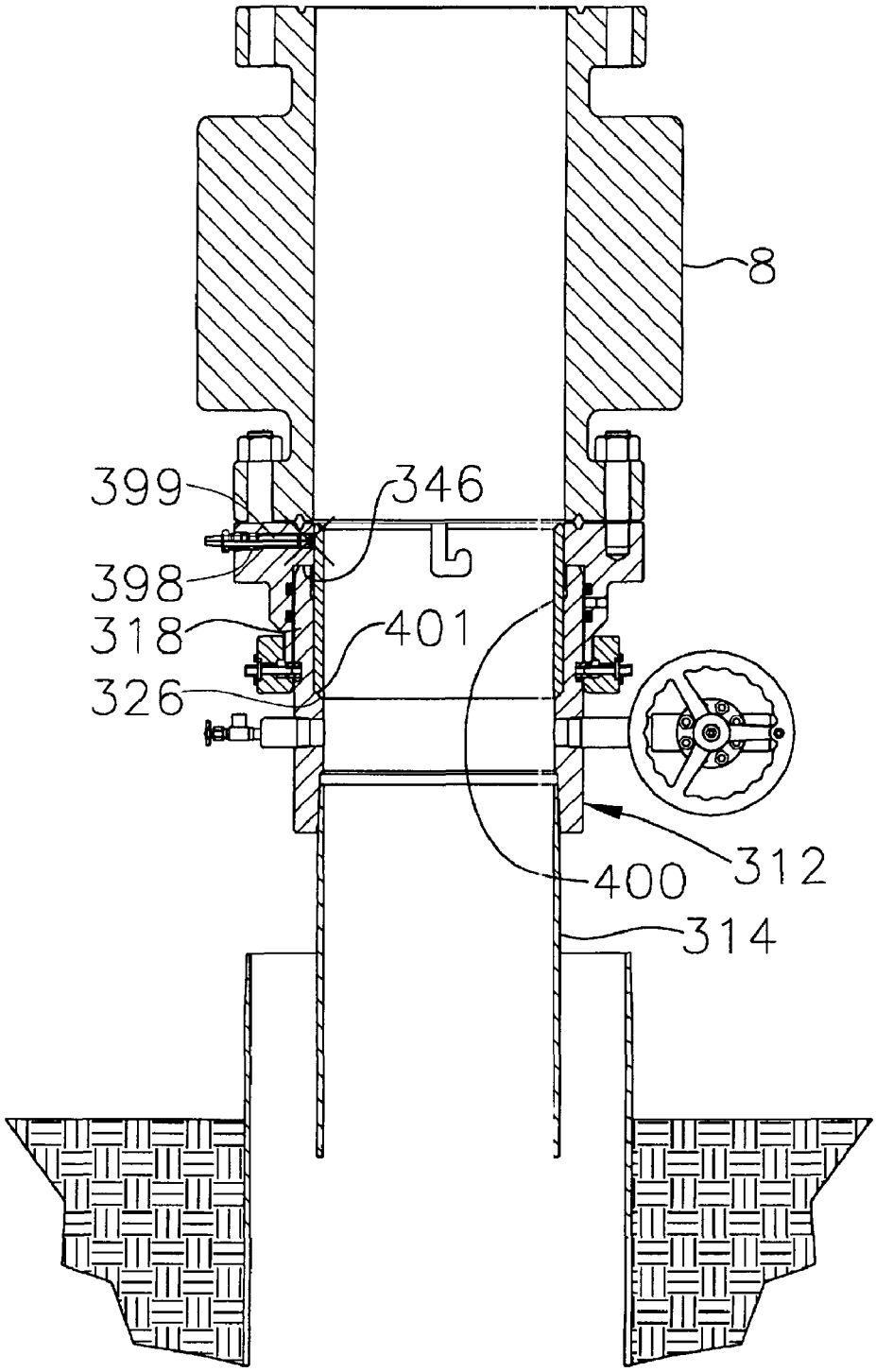
FIG. 5C is a cross-sectional view of another embodiment quick connector fitting assembly.

In an alternate embodiment, a casing head 312 is directly threaded on to the casing 314 (FIGS. 5A and 5C). With this embodiment, the casing head has a first portion 318. A second portion 320 extends below from the first portion. Threads 394 are formed in the lower inner surface of the second portion. These threads are matched to threads 328 formed on the outer surface of the casing head allowing for the torquing of the casing head to the casing (FIG. 5B). An annular lip 396 is formed on the inner surface of the second portion. The annular lip formes an upper shoulder 395 that slopes upward in a radially outward portion direction. In addition, the annular lip forms a lower annular shoulder 326. The quick connector fitting 340 mates with the casing head as described above in relation to the previous embodiment. The quick connector fitting also has a first section 342 which extends into a second section 344 forming an inner annular shoulder 346 at the interface between the first and second section inner surfaces.

With any of the above described embodiments, a wear bushing 400 (FIGS. 4E and 5C) may be fitted such that it lines the inner surface of the casing head first portion 218, 318 and a portion of the quick connector inner surface extending above the casing head first portion. When in position, typically, the bottom edge 401 of the wear bushing which is sloped mates with and rests against the sloping shoulder 226, 326 formed on inner surface of the casing head. Preferably, a threaded hole 298, 398 is formed radially through the second section 244, 324 of the quick connector fitting near the fitting inner shoulder 246, 346. When the wear bushing is properly seated, the threaded hole provides access to an outer surface of the bushing. A lock screw 299, 399 is threaded through the threaded hole for engaging and locking the wear bushing in place.

With any of the aforementioned embodiments, the BOP 8 (FIGS. 4A, 4E, 5A, 5C) or other well related equipment is connected, typically by fasteners, to the fitting. In this regard, the BOP or other well related equipment can be easily connected to or disconnected from the well casing.

Although the present invention has been described and illustrated to respect to multiple embodiments thereof, it is to be understood that it is not to be so limited, since changes and modifications may be made therein which are within the full intended scope of this invention as hereinafter claimed.

What is claimed is:

1. A quick connect assembly for providing an interface for the attachment of equipment to a well casing, the assembly comprising:

a tubular male receiver comprising, a first end for coupling to the well casing, a second end *above the first end, said second end* forming a mouth, and a first annular lip formed around the second end, the annular lip having a lower *annular* surface *extending circumferentially around the second end below an upper surface and a peripheral surface between the lower and upper surfaces, said lower surface* sloping upward in a radially outward direction; and a fitting mounted over the second end of the male receiver, the fitting comprising, a first section having a cylindrical inner surface having a diameter at least as large as [the] *an* outer surface diameter of the annular lip, *said cylindrical inner surface surrounding and being adjacent to said lip peripheral surface,* a second section [over] *above* the first section, a surface at an upper end of the second section for interfacing with [the] equipment to be mounted, *and* at least a threaded opening formed radially through the first section[,]*;* and a fastener threaded through the opening and having a frusto-conical tip [portion for] engaging the lower sloping surface of the first lip [for] *and* pulling the fitting against the male receiver and for fastening the fitting to the male receiver.

2. An assembly as recited in claim 1 further comprising a seal between the annular lip and the first section.

3. An assembly as recited in claim 1 further comprising a second a annular lip formed around the outer surface of the male receiver below and spaced apart from the first lip forming a groove therebetween.

4. An assembly as recited in claim 3 further comprising at least one depression on the second annular lip for accepting a torque tool for torquing the male receiver to the coupling.

5. An assembly as recited in claim 1 further comprising a coupling member for coupling the male receiver to the casing, wherein the coupling member comprises inner threads for threading to an outer surface of the well casing and to the outer surface of the male receiver.

6. An assembly as recited in claim 1 wherein the fitting further comprises intermediate section between the first and second sections, wherein the intermediate section has a frusto-conical inner surface and wherein the annular lip [comprises an] upper surface [sloping] *slopes* downward in a radially outward direction, wherein the frusto-conical inner surface is complementary to the lip upper surface.

7. An assembly as recited in claim 6 wherein [the annular lip lower surface slopes upwards in a radially outward direction, and wherein] threading of the fastener on the threaded opening causes the fastener to engage the sloping lower surface of the lip, wherein as the fastener is further threaded, the lip lower surface guides the fastener downward causing the fitting to move downward and the frusto-conical inner surface to engage the complementary upper surface of the lip.

8. An assembly as recited in claim 1 wherein the fitting comprises four radially threaded openings through the second section and wherein the assembly comprises four fasteners threaded through the openings and engaging the lower surface of the lip.

[9. A quick connect assembly for providing an interface for the attachment of equipment to a well casing, the assembly comprising:

an annular fitting having an inner and an outer surface for fitting over a well casing, comprising, a surface at a top end of the fitting for providing an interface for the equipment to be mounted, an annular surface extending from the inner surface for engaging the casing mouth, and an annular groove formed on the outer surface near a lower end of the fitting, the groove having an upper surface, a lower surface and a side surface therebetween;

an annular retainer slip comprising, an upper annular lip extending radially inward for fitting within the tilting annular groove, and a lower annular lip extending radially inward and having an annular edge comprising a surface for frictionally engaging an outer surface of the casing; and a clamp surrounding the retainer slip for compressing the retainer slip toward the casing.]

[10. An assembly as recited in claim 9 further comprising:

an inner annular groove formed on the inner surface of the fitting below the fitting annular surface; and an annular seal within the inner annular groove.]

[11. An assembly as recited in claim 10 further comprising:

a second annular groove formed on the inner surface of the fitting below the first annular groove; and a second annular seal within the inner annular groove.]

[12. An assembly as recited in claim 10 further comprising an injection fitting extending from the outer surface of the fitting and providing access to the annular groove for injecting the groove with a sealing material.]

[13. An assembly as recited in claim 10 wherein the retainer slip lower annular lip surface for engaging the outer surface of the casing comprises teeth.]

[14. An assembly as recited in claim 13 wherein the retainer slip comprises at least two sections and wherein the fitting outer annular groove has a bottom surface that slopes downward in a radially outward direction, wherein the retainer slip upper lip has a bottom surface that slopes downward in a radially outward direction, wherein as the clamp is tightened around the retainer slip it causes the teeth on the bottom lip to engage the outer surface of the casing fixing the retainer slip relative to the casing, wherein further tightening of the clamp causes the retainer slip upper lip bottom surface to ride on the fitting annular groove bottom surface causing the fitting to move downward and the fitting inner lip to seat on the casing.]

15. A quick connect assembly for providing an interface for the attachment of equipment to a well casing having a mouth and outer threads, the assembly comprising:

an annular bushing [for threading] *threaded* on *and surrounding* a well casing *head*, the bushing having [an] *a generally cylindrical* outer surface and comprising[, and] a depression on the outer surface;

a fitting mounted over the bushing, the fitting having a central opening and comprising, an annular shoulder formed around the central opening for seating on the mouth of the casing, an annular wall extending [downward] from the shoulder *surrounding the bushing and the well casing and* having an inner surface diameter not less than [the] *an* outer surface diameter of the bushing, and a radially threaded bore aligned with the depression, and a surface at an [upper] end of the fitting for interfacing with [the] equipment; and a fastener having outer threads matched to the threads on the radial bore, wherein the fastener is threaded through the threaded bore and extends into the depression for fastening the fitting to the bushing and thereby the casing.

16. An assembly as recited in claim 15 further comprising:

an annular groove formed on the shoulder; and an annular seal seated in the groove.

17. An assembly as recited in claim 15 wherein the depression formed on the outer surface of the bushing is an annular groove.

18. An assembly as recited in claim 17 wherein the groove has an upper surface sloping upward in a radially outward direction, wherein the fastener has a head having a tip having a frusto-conical shaped surface, wherein as the fastener is threaded on the threaded bore a frusto-conical surface of the tip engages the upper surface of the groove guiding the fastener in a downward direction and thereby causing the fitting to move downward for sitting on the mouth of the casing.

19. An assembly as recited in claim 18 comprising:

a plurality of threaded bores formed on the annular wall aligned with the annular groove; and a plurality of fasteners for threading into the threaded bores for engaging the groove.

20. An assembly as recited in claim 19 wherein each fastener further comprises a shaft extending from the tip and having a threaded section, wherein the assembly further [comprising] *comprises* lock nuts having inner threads matched to the threads of the threaded section, wherein each nut is threaded on the shaft from an end opposite the tip, wherein the nut contacts the annular wall and exerts a radially outward force on the fastener.

21. An assembly as recited in claim 20 further comprising a retainer behind the shaft threads on each fastener for preventing the lock nuts from sliding off the fastener shafts.

22. A method for removably connecting a fitting to a well casing having a mouth and external threads allowing for the attachment of well related equipment, the method comprising the steps of:

threading a bushing on the external threads of the casing, the bushing having [an] *a generally cylindrical outer surface and an annular groove formed on said generally cylindrical* outer [depression] *surface*;

mounting a fitting over the bushing and well [head] *casing*, the fitting providing an interface for mounting well related equipment; [and]

*orienting the fitting to a desired position over the bushing and casing; and*

*threading a fastener through the fitting to engage the annular groove on the bushing* fastening the fitting against the [depression] *annular groove* on the bushing.

[23. A method as recited in claim 22 wherein the depression on the bushing is an annular groove, the method further comprising the step of orienting the fitting to a desired position over the bushing and casing prior to the step of fastening.]

[24. A method as recited in claim 23 wherein the step of fastening comprises the step of threading fasteners through the fitting to engage the groove.]

25. A method as recited in claim [24] *22* further comprising the step of threading a nut on a fastener from end opposite an end engaging the groove for contacting the fitting and preventing the loosening of the fastener from the fitting.

26. A method as recited in claim 22 wherein the step of fastening comprises the step of pulling the fitting toward the casing for seating on the mouth of the casing.

27. A method as recited in claim 26 wherein the step of fastening further comprises the step of forming a seal between the fitting and the mouth of the casing.

28. A method as recited in claim 22 wherein the step of threading comprises the step of threading the bushing to a location about ⅛ inch to ⅜ inch below the mouth of the casing.

29. A quick connect assembly for providing an interface for the attachment of equipment to a well casing, the assembly comprising:

a casing head comprising, a first portion forming a mouth and having an outer surface diameter;

a second portion for coupling to the well casino, and a groove formed on the outer surface of the casing head;

a fitting mounted over the first portion of the casing head, the fitting comprising, a first section [mounted over the first portion of the casing head, the fitting first section] comprising [a lower] *an* annular edge, *and* a second section extending over the first section and having a surface for interfacing with the equipment to be mounted;

an annular flange nut releasably coupled to the fitting and having a channel formed on its inner surface[;] and *comprising,*

*an upper annular section coupled to the fitting,*

*an intermediate section extending from the upper section and having an inner surface diameter larger than the first section, and*

*a lower section below the upper annular section, said lower section extending from the intermediate section and having an inner surface diameter smaller than the inner surface diameter of the first section, wherein the channel is bounded by the three annular flange nut sections;* a plurality of [lock] *load* keys located in the channel and moveable to a position within the groove on the outer surface of the casing head for engaging a surface of the groove and the first section lower annular edge*; and*

*a load key bolt for each load key for moving said load keys for engaging the surface of the groove, wherein threads are formed on an outer surface of the fitting first section, wherein threads are formed on the inner surface of the flange nut upper annular section, wherein the flange nut upper annular section is threaded to the fitting first section, and wherein each load key bolt radially penetrates a corresponding opening formed on the second section of the flange nut and threadedly engages a load key.*

[30. An assembly as recited in claim 29 wherein the annular flange nut comprises:

an upper annular section coupled to the fitting;

an intermediate section extending from the upper section and having an inner surface diameter larger than the first section; and a lower section extending from the intermediate section and having an inner surface diameter smaller than the inner surface diameter of the first section, wherein the channel is bounded by the three sections.]

[31. An assembly as recited in claim 30 wherein threads are formed on a lower portion of the outer surface of the fitting first section and wherein threads are formed on the inner surface of the flange nut upper section, and wherein the flange nut upper section is threaded to the lower portion of the fitting first section.]

[32. An assembly as recited in claim 31 further comprising a load key bolt corresponding to each load key, wherein each load key bolt radially penetrates a corresponding opening formed on the second section of the flange nut and threadedly engages a load key.]

33. An assembly as recited in claim [32] *29* further comprising a retainer coupled to each load key bolt, wherein each retainer allows for rotational movement of its corresponding bolt, and wherein each retainer is mounted on an outer surface of the flange nut.

34. An assembly as recited in claim [31] *29* wherein each load key is arc shaped.

35. An assembly as recited in claim 34 wherein the groove formed on the outer surface of the casing head is an annular groove and wherein the load keys abut each other forming a ring when moved to a position in the annular groove.

36. An assembly as recited in claim [31] *29* wherein the casing head second portion has threads formed on its inner surface for threading onto threads formed on the outer surface of the casing.

37. An assembly as recited in claim 29 further comprising a coupling for coupling the casing head to the casing, the coupling having first and second ends and inner threads, wherein the first end of the coupling is threaded to the outer surface of the casing and wherein the casing head has outer threads for threading [on to] *onto* the inner threads at the second end of the coupling.

38. An assembly as recited in claim 29 further comprising:

a wear bushing lining at least a portion of the inner surface of the casing head and at least part of the inner surface of the quick connector fitting immediately above the casing head; and and a clock screw radially screwed through the fitting and engaging the bushing for retaining the bushing in place.

39. An assembly as recited in claim 29 further comprising:

an annular groove formed on the inner surface of the fitting; and a seal fitted within the annular groove for sealing against an outer surface of the casing head.

[40. A method for removably connecting a fitting to a well casing allowing for the attachment of well related equipment, the method comprising the steps of:

releasably coupling a casing head having an external groove to the casing;

mounting a fitting over the casing head, the fitting providing an interface for mounting well related equipment;

coupling a flange nut on the fitting, the flange nut comprising a plurality of moveable load keys; and moving the load keys into the groove for locking the fitting onto the casing head.]

[41. A method as recited in claim 40 wherein the coupling a flange nut step comprises the step of threading the flange nut on a lower outer surface portion of the fitting.]

[42. A method as recited in claim 41 further comprising the step of further threading the flange nut onto the fitting after the step of moving for causing the fitting to seat tightly against the casing head.]

[43. A method as recited in claim 40 wherein the keys are arc shaped.]

[44. A quick connect assembly for providing an interface for the attachment of equipment to a well casing, the assembly comprising:

a tubular male receiver comprising, a first end portion for coupling to the well casing, a second end portion forming a mouth, and an annular lip formed around the second end portion, the annular lip having a lower surface sloping upward in a radially outward direction;

a fitting mounted over the second end portion of the male receiver, the fitting comprising, a first section having a cylindrical inner surface having a diameter at least as large as the outer surface diameter of the annular lip, second section over the first section, a surface at an upper end of the second section for interfacing with the equipment to be mounted, and at least an opening formed radially through the first section; and a fastener fitted through the opening and having a frusto-conical tip portion engaging the lower sloping surface of the annular lip for pulling the fitting against male receiver and for fastening the fitting to the male receiver.]

[45. An assembly as recited in claim 44 further comprising a seal between the annular lip and the first section.]

[46. A quick connect assembly for providing an interface for the attachment of equipment to a well casing, the assembly comprising:

a tubular male receiver comprising, a first end portion for coupling to the well casing, a second end portion forming a mouth and having an outer surface, and a groove formed on the second end portion outer surfaces the groove having an upper surface sloping upward in a radially outward direction;

a fitting mounted over the second end portion of the male receiver, the fitting comprising, a first section having a cylindrical inner surface having a diameter at least as large as the outer surface diameter of the male receiver second end portion, second section over the first section, a surface at an upper end of the second section for interfacing with the equipment to be mounted, and at least an opening formed radially through the first section; and a fastener fitted through the opening and having a frusto-conical tip portion for engaging to the groove sloping upper surface for pulling the fitting against the male receiver and for fastening the fitting to the male receiver.]

[47. An assembly as recited in claim 46 further comprising a seal between the second end portion and the first section.]

[48. An assembly as recited in claim 46 wherein the groove circumferentially spans the entire second end portion outer surface.]

49. A quick connect assembly for providing an interface for the attachment of equipment to a well casing, the assembly comprising:

a tubular male receiver comprising, a first end for coupling to the well casing, a second end forming a mouth, [and]

a first annular lip formed around the second end, the annular lip having a lower surface, a second annular lip formed around [the] *an* outer surface of the male receiver below and spaced apart from the first lip forming a groove [there between] *therebetween, and* at least one depression on the second annular lip for accepting a torque tool for torquing the male receiver to the coupling; [and]

a fitting mounted [over] *above* the second end of the male receiver, the fitting comprising, a first section having a cylindrical inner surface having a diameter at least as large as [the] *an* outer surface diameter of the first annular lip, a second section [over] *above* the first section, a surface at an upper end of the second section for interfacing with [the] equipment to be attached, *and* at least a threaded opening formed radially through the first section, and a fastener threaded through the opening and engaging the lower surface of the first lip for fastening the fitting to the male receiver.

50. A quick connect assembly for providing an interface for the attachment of equipment to a well casing, the assembly comprising:

a tubular male receiver comprising, a first end for coupling to the well casing, a second end forming a mouth, and a first annular lip formed around the second end, the annular lip having an upper surface sloping downward in a radially outward direction and a lower surface; and a fitting mounted over the second end of the male receiver, the fitting comprising, a first section having a cylindrical inner surface having a diameter at least as large as the outer surface diameter of the annular lip, a second section over the first section, a surface at an upper end of the second section for interfacing with [the] equipment to be attached, an intermediate section between the first and second sections, wherein the intermediate section has a frusto-conical inner surface complementary to the lip upper surface;

at least a threaded opening formed radially through the first section, and a fastener threaded through the opening and engaging the lower surface of the first lip for fastening the fitting to the male receiver.

51. A quick connect assembly for providing an interface for the attachment of equipment to a well casing, the assembly comprising:

an annular fitting [having an inner and an outer surface for fitting] over a well casing[,] *the fitting having an inner surface and an outer surface and a top end over a bottom, the fitting* comprising, a surface at [a] *the* top end of the fitting for providing an interface for [the] equipment to be mounted, an annular surface extending from the inner surface for engaging the casing mouth, an inner annular groove formed on the inner surface of the fitting below the fitting annular surface, an injection fitting extending from the outer surface of the fitting and providing access to the inner annular groove for injecting the groove with a sealing material, and an annular groove formed on the outer surface near a lower end of the fitting, the groove having an upper surface, a lower surface and a side surface therebetween;

an annular retainer slip comprising, an upper annular lip extending radially inward for fitting within the fitting outer surface annular groove, and a lower annular lip *below the upper annular lip* extending radially inward and having an annular edge comprising a surface for engaging an outer surface of the casing; and a clamp surrounding the retainer slip for compressing the retainer slip toward the casing.

*52. A quick connect assembly:*

*a tubular member comprising,*

*a first end for coupling to a well casing,*

*a second end forming a mouth, and*

*a first annular lip formed around the second end, the annular lip having a lower surface sloping upward in a radially outward direction, said lower surface being below an upper surface; and*

*a fitting mounted over the second end of the tubular member, the fitting comprising,*

*a first section having a cylindrical inner surface having a diameter at least as large as an outer surface diameter of the first annular lip,*

*second section above the first section,*

*a frusto-conical section between the first and second sections, wherein the frusto-conical section has a frusto-conical inner surface and wherein the upper surface above the lower surface, said upper surface slopes downward in a radially outward direction, wherein the frusto-conical inner surface is complementary to the lip upper surface,*

*at least an opening formed radially through the first section, and*

*a fastener penetrating the opening and having a frusto-conical tip portion engaging the lower sloping surface of the first annular lip for pulling the fitting against the tubular member and fastening the fitting to the tubular member, wherein when the fastener is threaded through the opening it engages the sloping lower surface of the lip, and wherein during further threading of the fastener, the lip lower surface will guide the fastener downward causing the fitting to move downward and the frusto-conical inner surface to engage the complementary upper surface of the lip.*

*53. An assembly as recited in claim 52 further comprising a seal between the annular lip and the first section.*

*54. An assembly as recited in claim 52 further comprising a second annular lip formed around the outer surface of the tubular member below and spaced apart from the first lip forming a groove therebetween.*

*55. An assembly as recited in claim 52 further comprising at least one depression on the second annular lip for accepting a torque tool for torquing the tubular member to the coupling.*

*56. An assembly as recited in claim 52 wherein the fitting comprises four radial openings through the second section, said openings being equidistantly located around the second section, and wherein the assembly comprises four fasteners penetrating the openings and engaging the lower surface of the lip.*

*57. A quick connect assembly:*

*a well tubular member comprising,*

*an end forming a mouth, and*

*a first annular lip formed around the end, the first annular lip having a lower surface sloping upward in a radially outward direction, said lower surface being below an upper surface, said upper surface sloping outward and downward;*

*a second annular lip formed around an outer surface of the tubular member below and spaced apart from the first annular lip forming a groove therebetween; and*

*a fitting mounted over the end of the tubular member, the fitting comprising,*

*a first section having a cylindrical inner surface having a diameter at least as large as an outer surface diameter of the first annular lip,*

*second section above the first section,*

*a third section between the first and second sections having an inner surface complementary to the annular lip upper surface,*

*at least an opening formed radially through the first section, and*

*a fastener penetrating the opening and having a frusto-conical tip portion for engaging the lower sloping surface of the first annular lip for pulling the fitting against the tubular member and for fastening the fitting to the tubular member, wherein when the fastener is threaded through the opening it engages the sloping lower surface of the first annular lip, and wherein as the fastener is further threaded, the first annular lip lower surface guides the fastener downward causing the fitting to move downward and the third section inner surface to engage the complementary upper surface of the first annular lip.*

*58. An assembly as recited in claim 57 wherein the fitting further comprises a frusto-conical section between the first and second sections, wherein the frusto-conical section has a frusto-conical inner surface and wherein the first annular lip comprises an upper surface sloping downward in a radially outward direction, wherein the frusto-conical inner surface is complementary to the first annular lip upper surface.*

*59. A quick connect assembly for providing an interface for the attachment of equipment to a well casing, the assembly comprising:*

*an annular fitting for fitting over a well casing, the fitting having an inner surface and an outer surface and a top end over a bottom end comprising,*

*a surface at the top end of the fitting for providing an interface for equipment to be mounted,*

*an annular surface extending from the inner surface for engaging the casing,*

*an inner annular groove formed on the inner surface of the annular fitting below the fitting annular surface,*

*an annular seal within the inner annular groove, and*

*an annular groove formed on the outer surface near a lower end of the fitting, the groove having an upper surface, a lower surface and a side surface therebetween;*

*an annular retainer slip comprising,*

*an upper annular lip extending radially inward for fitting within the fitting annular groove, and*

*a lower annular lip below the upper annular lip extending radially inward and having an annular edge comprising a surface comprising teeth for frictionally engaging an outer surface of the casing;*

*a clamp surrounding the retainer slip for compressing the retainer slip toward the casing, wherein the retainer slip comprises at least two sections and wherein the fitting outer annular groove has a bottom surface that slopes downward in a radially outward direction, wherein the retainer slip upper lip has a bottom surface that slopes downward in a radially outward direction, wherein as the clamp is tightened around the retainer slip it causes the teeth on the bottom lip to engage the outer surface of the casing fixing the retainer slip relative to the casing, wherein further tightening of the clamp causes the retainer slip upper lip bottom surface to ride on the fitting annular groove bottom surface causing the fitting to move downward and the fitting inner lip to seat on the casing.*

*60. An assembly as recited in claim 59 further comprising:*

*a second annular groove formed on the inner surface of the fitting below the first annular groove; and*

*a second annular seal within the inner annular groove.*

*61. A quick connect assembly for providing an interface for the attachment of equipment to a well casing, the assembly comprising:*

*casing head comprising,*

*a first portion forming a mouth and having an outer surface;*

*a second portion for coupling to the well casing, and*

*a groove formed on the outer surface of the casing head;*

*a fitting over the first portion of the casing head, the fitting comprising,*

*a first section mounted over the first portion of the casing head, the fitting first section comprising a lower annular edge, and*

*a second section extending over the first section and having a surface for interfacing with the equipment to be mounted;*

*an annular flange nut releasably coupled to the fitting and having a channel formed on its inner surface;*

*a plurality of load keys located in the channel and moveable to a position within the groove on the outer surface of the casing head for engaging a surface of the groove and the first section lower annular edge;*

*a load key bolt for each load key for moving said load keys for engaging the surface of the groove;*

*a wear bushing lining at least a portion of the inner surface of the casing head and at least part of the inner surface of the quick connector fitting immediately above the casing head; and*

*a lock screw radially screwed through the fitting and engaging the bushing for retaining the bushing in place.*

*62. A quick connect assembly:*

*a tubular member comprising,*

*a first end for coupling to a well casing,*

*a second end above the first end, said second end forming a mouth, and*

*an annular lip formed around the second end, the annular lip having a lower annular surface sloping upward in a radially outward direction, said lower surface being extending circumferentially around the second end below an upper surface, and a peripheral surface between the lower and upper surfaces;*

*a fitting mounted over the second end of the tubular member, the fitting comprising,*

*a first section having a cylindrical inner surface having a diameter at least as large as an outer surface diameter of the annular lip said cylindrical inner surface surrounding and being adjacent to said lip peripheral surface,*

*a second section above the first section, and*

*at least an opening formed radially through the first section;*

*a fastener penetrating the opening and having a frustoconical tip portion for engaging the lower sloping surface of the annular lip for pulling the fitting against the tubular member and for fastening the fitting to the tubular member; and*

*at least one depression on the annular lip for accepting a torque tool for torquing the tubular member to the coupling.*

* * * * *

UNITED STATES PATENT AND TRADEMARK OFFICE

CERTIFICATE OF CORRECTION

PATENT NO. : RE43,697 E
APPLICATION NO. : 10/325047
DATED : October 2, 2012
INVENTOR(S) : Rex E. Duhn It is certified that error appears in the above-identified patent and that said Letters Patent is hereby corrected as shown below:

In the Claims

Column 14, Claim 38, line 21 Delete "and a clock"

Insert -- a lock --

Signed and Sealed this
Twentieth Day of May, 2014

Michelle K. Lee

Michelle K. Lee
*Deputy Director of the United States Patent and Trademark Office*